United States Patent
Nishiguchi et al.

(10) Patent No.: US 6,937,183 B2
(45) Date of Patent: Aug. 30, 2005

(54) OBJECT DETECTING METHOD AND OBJECT DETECTOR

(75) Inventors: Tadao Nishiguchi, Kyoto (JP); Shinichiro Okamura, Kyoto (JP); Hirohisa Furukawa, Shiga (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/690,520

(22) Filed: Oct. 23, 2003

(65) Prior Publication Data

US 2004/0125009 A1 Jul. 1, 2004

(30) Foreign Application Priority Data

Oct. 23, 2002 (JP) ........................................ 2002-308091

(51) Int. Cl.⁷ .............................................. G01S 13/06
(52) U.S. Cl. ............................. 342/28; 342/70; 342/81; 342/157; 342/158
(58) Field of Search ............................ 342/27, 28, 56, 342/70, 81, 89, 91, 157–159, 162, 195, 379

(56) References Cited

U.S. PATENT DOCUMENTS

| | | | | | |
|---|---|---|---|---|---|
| 3,982,245 A | * | 9/1976 | Soule et al. | ................ | 342/379 |
| 4,123,755 A | * | 10/1978 | Fishbein et al. | ............ | 342/203 |
| 4,204,211 A | * | 5/1980 | Cavelos | ...................... | 342/380 |
| 4,379,295 A | * | 4/1983 | Lewis et al. | ................ | 342/201 |
| 5,525,990 A | * | 6/1996 | Lewis | ........................ | 342/39 |
| 6,014,897 A | * | 1/2000 | Mo | ............................. | 73/628 |
| 6,121,914 A | * | 9/2000 | Cavelos et al. | ............... | 342/16 |
| 6,166,689 A | * | 12/2000 | Dickey et al. | ................ | 342/381 |
| 6,225,943 B1 | * | 5/2001 | Curley et al. | ............... | 342/137 |
| 6,392,588 B1 | * | 5/2002 | Levanon | ..................... | 342/202 |
| 2004/0125009 A1 | * | 7/2004 | Nishiguchi et al. | .......... | 342/28 |
| 2004/0196172 A1 | * | 10/2004 | Wasiewicz | ................... | 342/33 |

FOREIGN PATENT DOCUMENTS

JP 09-096667 4/1997

* cited by examiner

Primary Examiner—John B. Sotomayor
(74) Attorney, Agent, or Firm—Dickstein Shapiro Morin & Oshinsky LLP

(57) ABSTRACT

Beams are irradiated in three directions by switching an irradiation direction of a mainlobe of an antenna by stages, and an echo is received from a detection object obtained in the mainlobe or a sidelobe in each irradiation direction. Then, reflection power intensity in each irradiation direction is found from the received echo, and pattern of relative variation of the reflection power intensity (power intensity pattern) in each irradiation direction is generated. Meanwhile, a detection region is divided into seven bearings "c" to "i" and a power intensity pattern when an object exists in each bearing is previously stored as a reference pattern in each bearing. Then, the bearing in which the detection object exists is specified by comparing the power intensity pattern obtained from the received echo with the reference pattern in each bearing.

10 Claims, 10 Drawing Sheets

OBJECT DETECTING METHOD AND OBJECT DETECTOR

BACKGROUND OF THE INVENTION

1. Field of the Invention

The present invention relates to effective technique for an object detector using a scanning antenna.

2. Description of the Prior Art

Technique for detecting an object by scanning beams in a given region with a scanning antenna and analyzing an echo reflected by an object existing in the detection region is well known. Such remote sensing technique using the electric wave is applied to an electric wave sensor such as a detector of an intruder for security or a car detector for a vehicle, for example.

In the case of the electric wave sensor using the scanning antenna, since it is necessary to distinguish between a detection object and another object and specify an accurate bearing of the detection object, superior directional characteristics are demanded as antenna characteristics in general. In addition, in order to improve bearing resolution, it is desirable that the irradiation direction of the beam can be varied finely.

However, when the directional characteristics of the antenna are enhanced to narrow an angle of a mainlobe or to increase a gain, a level of a sidelobe is raised (performance of sidelobe suppression is lowered). In this case, there arises a problem that an object existing in unintended bearing is detected because of the sidelobe and the bearing of the detection object could be misjudged (directional error detection).

Especially, in the case of the electronic scanning antenna which electronically varies the directional characteristics, since a larger sidelobe is generated as compared with a mechanical scanning antenna, the directional error detection due to the sidelobe becomes a serious problem.

In order to solve the above problem, various attempts have been made to reduce an influence of the sidelobe. For example, a method of removing a sidelobe pattern from level distribution by beat frequency.

Another example is a method of suppressing the sidelobe by devising constitutions of a transmission antenna and a reception antenna.

However, since only the mainlobe contributes to the object detection in either method, it is necessary to enhance the directional characteristics of the antenna and to control the variation amount in the mainlobe irradiation direction finely in order to improve the bearing resolution.

Therefore, in the case of the electronic scanning type of the phased array antenna, the number of the antenna elements has to be increased and performance of a phase shifter has to be enhanced, which causes the constitution to be complicated and enlarged and increasing the cost. Therefore, its practical application is difficult at a consumer level. In addition, in the case of the mechanical scanning type of the antenna also, since signal processing speed has to be increased due to the increase in the number of sampling of the echo and an antenna angle has to be controlled with high precision, its practical application is difficult also from a view point of the cost.

Besides, in order to enhance the directional characteristics of the antenna and improve the performance of the sidelobe suppression, designing and manufacturing of the antenna and a line length of its electric circuit becomes sever, which increases the cost also.

SUMMARY OF THE INVENTION

The present invention was made in view of the above problems and it is an object of the present invention to provide technique capable of detecting an object with a simple and inexpensive constitution, in which directional error detection is not hardly generated and bearing resolution is high.

In addition, it is a second object of the present invention to provide technique capable of detecting an object without the directional error detection even with an antenna having low performance of sidelobe suppression.

Furthermore, it is a third object of the present invention to provide technique capable of improving bearing resolution without varying a variation amount of a mainlobe irradiation direction.

The inventors of the present invention have studied the technique earnestly, to solve the above problems in the prior art. The summary thereof is described hereinafter.

Conventionally, as a measure to prevent the directional error detection, research and development for the purpose of improvement of the sidelobe suppression performance or removal of a sidelobe signal have been the mainstream. However, this approach has a limit in implementing simplicity of the constitution, reduction in designing and manufacturing costs, improvement of the bearing resolution and the like.

Thus, the inventors of the present invention got an idea that the echo obtained from the sidelobe could be used for object detection instead of removing the sidelobe as a noise.

However, even when only the reflection power intensity in one direction is analyzed, it is not easy to distinguish whether it is obtained from the mainlobe or the sidelobe. This is because the reflection power intensity is varied depending on the size of the object and distance up to the object, as well as intensity of an irradiated beam but also the size of the object and distance up to the object.

Then, the inventors of the present invention focused attention on a rule of the directional characteristics of the antenna. In general, the directional characteristics of the antenna comprises the mainlobe in which a gain (highness of radiation performance) is the maximum and the plural sidelobes repetitively appearing on both sides thereof. In addition, there are null points between the mainlobe and the sidelobe and between the adjacent two sidelobes, in which the gain falls down extremely.

In other words, the observed reflection power intensity Varies depending on the bearing in which the detection object exists as follows. When the object exists in the peak direction of the mainlobe, the reflection power intensity becomes the maximum. As it deviates from that direction, the reflection power intensity is decreased and when the bearing of the detection object coincides with a first null point, the reflection power intensity becomes the minimum. While the bearing of the object further deviates, the reflection power intensity becomes the maximum again at a position of a first sidelobe. Thereafter, variation is repeated such that it becomes the minimum at a position of a second null point and becomes the maximum at a position of a second sidelobe so on.

Considering this fact reversely, when the reflection power intensity in the plural directions is obtained by switching the mainlobe irradiation direction of the antenna, the relative variation shows a characteristic pattern in accordance with the directional characteristics of the antenna. Then, when the directional characteristic of the antenna is set such that the pattern may correspond to the bearing in which the detection object exists on one-on-one, the bearing in which the detection object exists can be calculated back based on the observed pattern.

The present invention is constituted based on the above study as follows, for example. The irradiation direction of the mainlobe of the antenna is switched by stages to irradiate the beam in the plural directions and the echo is received from the detection object obtained in the mainlobe or the sidelobe. Then, the reflection power intensity is found from the received echo in each irradiation direction and the bearing in Which the detection object exists is specified based on the pattern of relative variation of the reflection power intensity in each irradiation direction.

According to this constitution, it is not necessary to remove the sidelobe but the echo from the sidelobe can be used in specifying the bearing. More specifically, the reflection power intensity is found from the received echo without distinguishing between the echo obtained from the mainlobe and the echo obtained from the sidelobe. Thus, the constitutions of the antenna and the signal processing part become simple and inexpensive. Besides, the object detection can be performed without the directional error detection even with the antenna having inferior performance of sidelobe suppression.

Furthermore, since the bearing is not specified based on an absolute value of the reflection power intensity but specified based on the relative variation pattern, the existence of the detection object and its bearing can be detected with high precision without depending on a size of the detection object or a distance up to the object.

Still further, according to this constitution, since the bearing is specified based on the pattern of relative variation of the reflection power intensity in each direction, the bearing resolution can be easily improved according to the setting of the directional characteristics of the antenna without depending on the variation amount of the irradiation direction. For example, the directional characteristics of the antenna may be set such that an angle between a peak of the mainlobe and a peak of a first sidelobe becomes almost double of an angle between the peak of the first sidelobe and a peak of a second sidelobe. In addition, the mainlobe irradiation direction may be switched such that a peak angle of the mainlobe in the next irradiation direction becomes an angle of a first null point in the previous irradiation direction. Thus, the bearing resolution can be improved almost twice as good without changing a variation amount of the irradiation direction.

In addition, it is preferable that a detection region is divided into a plurality of bearings and a pattern of a relative variation of power intensity in each irradiation direction when an object exists in each bearing is previously stored as a reference pattern in each bearing, the bearing in which the detection object exists is specified by comparing the power intensity pattern obtained from the received echo with the reference pattern in each bearing.

DESCRIPTION OF THE PREFERRED EMOBIDMENTS

Hereinafter, preferred embodiments are illustratively described in detail with reference to the drawings. An object detector and an object detecting method according to the present invention can be appropriately used as various kinds of object detectors such as a security sensor detecting an intruder or an intruding object, an in-car sensor detecting a forward car or an obstacle, a car sensor set at a parking lot or the like.

In addition, the present invention is not limited to dimensions, quality, configurations and its relative arrangement of components described in the following embodiments of the present invention as long as there is no specific description.

Figure 1:
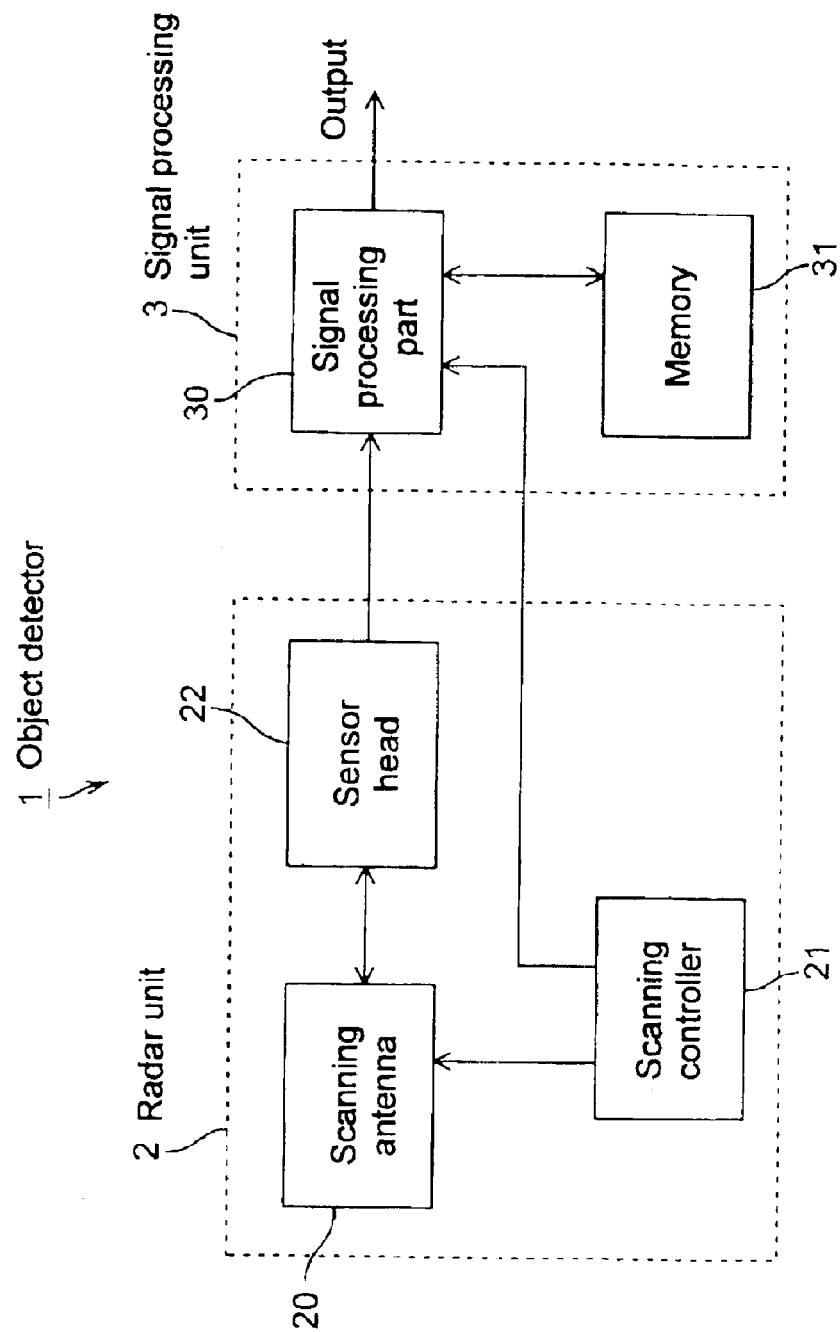
FIG. 1 is a block diagram showing a schematic constitution of an object detector according to an embodiment of the present invention.

FIG. 1 is a block diagram showing a rough constitution of an object detector according to an embodiment of the present invention.

As shown in FIG. 1, the object detector 1 roughly comprises a radar unit 2 performing remote sensing using an electric wave, and a signal processing unit 3 operating data obtained by the radar unit 2. As needed, it may comprise an output part outputting data processed by the signal processing unit 3, and an input part through which an instruction or setting is made for the signal processing unit 3 or a parameter is input. In addition, the radar unit 2, the signal processing unit 3, the output part and the input part may be incorporated into an apparatus with an integrated constitution or respective components or a part of them may be separately constituted.

The radar unit 2 comprises a scanning antenna 20, a scanning controller 21 and a sensor head 22. As a radar method, there are a pulse radar method of using a pulse wave as an electric wave irradiated from the antenna, and a continuous wave radar method of using a frequency modulation wave as it. Both methods can be employed. As a concrete example of the continuous wave radar method, there is an FM-CW method or the like. A frequency band of the electric wave to be used is not specifically limited.

The scanning antenna 20 is an antenna having a function of switching a mainlobe irradiation direction by stages to be able to irradiate beams in a plurality of irradiation directions. As a scanning method in general, there are an electronic scanning method which electronically varies directional characteristics without having a mechanical movable part, and a mechanical scanning method which varies an antenna direction mechanically. Both of them can be applicable.

As the electronic scanning method, there are a phased array antenna in which directional characteristics of the whole antenna comprising a plurality of antenna elements are varied by varying a feeding phase with a phase shifter; a feeding point switching-type antenna in which directional characteristics formed by switching a feeding point through a dielectric lens are varied, an antenna switching-type antenna in which a plurality of antennas which were offset at a setting angle previously are switched and a difference in mainlobe irradiated from each antenna is used and the like. In addition, according to the mechanical scanning method, a direction of a single antenna is varied by a motor to vary an irradiation direction of a mainlobe.

The scanning controller 21 controls to vary the directional characteristics of the scanning antenna 20. The scanning controller 21 varies the directional characteristics of the antenna at constant time intervals and switches the irradiation direction of the mainlobe by stages. Although the irradiation direction of the mainlobe may be continuously switched, it is preferably switched by stages from the viewpoint of costs, processing speed or the like. In addition, the scanning controller 21 has a function of outputting bearing information showing the irradiation direction of the mainlobe, to the signal processing unit 3.

The sensor head 22 has a function of generating a signal to be irradiated from the antenna, and a function of finding reflection power intensity from a received echo (a signal reflected from a detected object). The reflection power intensity calculated by the sensor head 22 is output to the signal processing unit 3.

The signal processing unit 3 roughly comprises a signal processing part 30 and a memory 31.

The signal processing part 30 comprises a computer consisting of a CPU, a ROM and a RAM and the like, as a basic hardware. During its operation, when a program stored in the ROM is read by the CPU to be implemented, various functions according to an object detecting operation to be describe later are carried out.

The memory 31 is storing means comprising a rewritable memory or a magnetic disc device or the like, from which data is read or to which data is written, by the signal processing part 30. In the memory 31, reflected power intensity information input from the radar unit 2, bearing information input from the scanning controller 21 and the like are recorded, updated and stored as needed. In addition, information such as reference pattern in each bearing is previously stored in the memory 31 and referred to when the bearing is specified in the object detecting operation.

Figure 2:
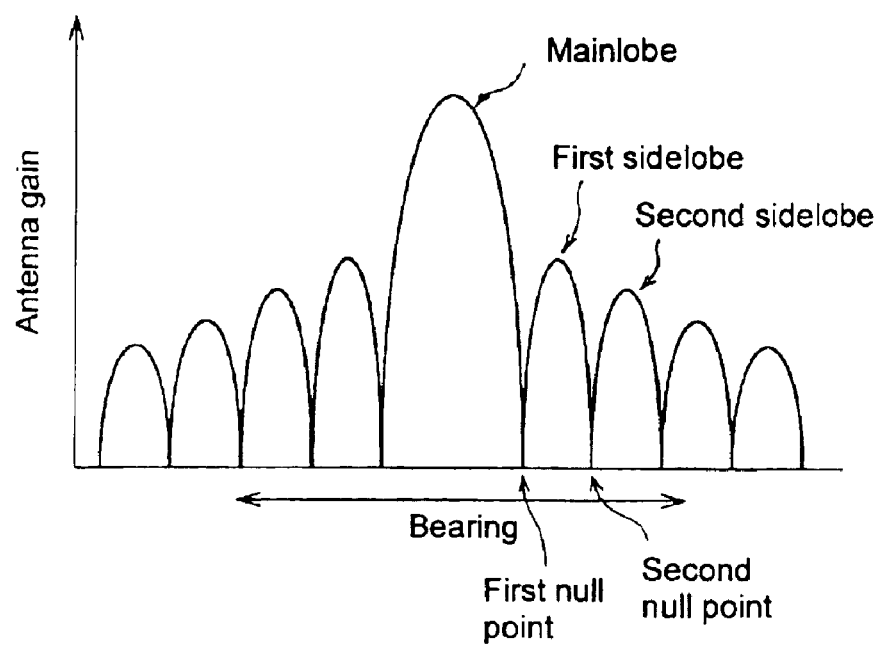
FIG. 2 is a graph of an antenna pattern showing an example of directional characteristics of an antenna.

FIG. 2 is a graph of an antenna pattern showing an example of the directional characteristics of the scanning antenna 20. The directional characteristics of the antenna comprises a mainlobe in which a gain (highness of radiation performance) is the maximum and a plurality of sidelobes repetitively appearing both sides thereof. In addition, there are null points where the gains extremely fall down, between the mainlobe and the sidelobe and between the adjacent sidelobes. In the example shown in FIG. 2, there are first to fourth sidelobes appearing symmetrically on both sides of the mainlobe.

According to this embodiment, the directional characteristic of the antenna are set such that an angle between a peak of the mainlobe and a peak of the first sidelobe may be about the double of an angle between the peak of the first sidelobe and a peak of the second sidelobe. Then, the irradiation direction of the mainlobe is switched to three bearings such that a peak angle of the mainlobe in the next irradiation direction may become the angle of the first null point in the previous irradiation direction, in the antenna. This manner is shown in FIG. 3.

Figure 3:
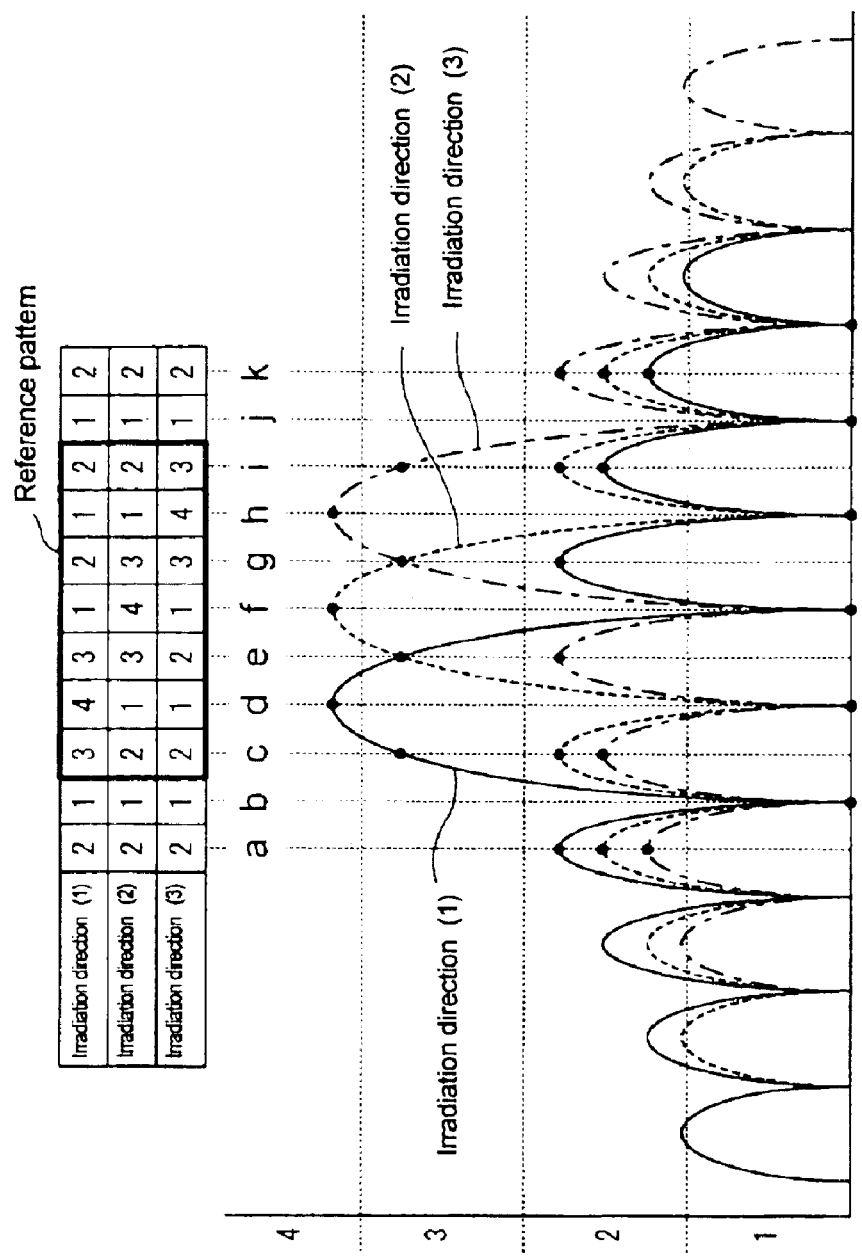
FIG. 3 is an explanatory view showing-power intensity patterns observed when the irradiation direction of a mainlobe is switched to three bearings.

Referring to FIG. 3, an antenna pattern of an irradiation direction (1), an antenna pattern of an irradiation direction (2) and an antenna pattern of an irradiation direction (3) are designated by a solid line, a broken like and an alternate long and short dashed line, respectively. In FIG. 3, an abscissa axis designates the bearing, and the antenna scanning is performed from the left to right. An ordinate axis designates an antenna gain which is shown at four levels 1 to 4 as a matter of convenience of description here.

For example, when a detection object exists at a position of bearing "a", an echo is observed from the first sidelobe in the irradiation direction (1), from the second sidelobe in the irradiation direction (2), and from the third sidelobe in the irradiation direction (3), respectively. Since all sidelobes are at level 2, a relative variation of the reflection power intensity in each irradiation direction is obtained as a pattern such as 2-2-2. Hereinafter, the pattern of the relative variation of the reflection power intensity in each irradiation direction is referred to as a "power intensity pattern".

When the detection object exists at a position of bearing "b", since it just overlaps the null point in any irradiation direction, almost no echo is observed and the power intensity pattern is 1-1-1.

When the detection object exists at a position of bearing "c", the echo is observed from a middle part of the mainlobe in the irradiation direction (1), from the first sidelobe in the irradiation direction (2), and from the second sidelobe in the irradiation direction (3). The power intensity pattern at this time is 3-2-2.

When the detection object exists at a position of bearing "d", although the echo is observed at the peak of the mainlobe when it is in the irradiation direction (1), it overlaps the null point in the irradiation directions (2) and (3) in which the echo is not observed. Therefore, the power intensity pattern is 4-1-1.

Similarly, the power intensity patterns can be provided in the bearings "e" to "k". The power intensity patterns provided in each bearing are as shown in a table at the upper part of FIG. 3.

As can be clear from this table, when the antenna having the above directional characteristics is used, the power intensity pattern corresponds to the bearing in which the detection object exists, on one-on-one with regard to the seven bearings "c" to "i". Therefore, the bearing in which the object exists can be uniquely specified by dividing a detection region previously into the plural bearings "c" to "i", finding the power intensity pattern when the object exists in each bearing, storing them in the memory 31 as a reference pattern in each bearing (corresponding to the part surrounded by a heavy line in the table), and comparing the power intensity pattern obtained from the received echo with the reference pattern in each bearing.

Thus, according to this embodiment, bearing resolution of seven bearings can be implemented, based on the reflection power intensity of three irradiation directions (1) to (3). In other words, when the number of the irradiation directions the antenna can take is "n", the bearing resolution is improved in (2n+1) bearings.

The bearing resolution can be further improved by varying the directional characteristics of the antenna or increasing the number of the irradiation directions. In addition, although relative variation of the power intensity is at four levels 1 to 4 in this embodiment, the bearing resolution can be improved by increasing the number of the levels.

An operation flow of the object detecting operation is described in detail.

Figure 4:
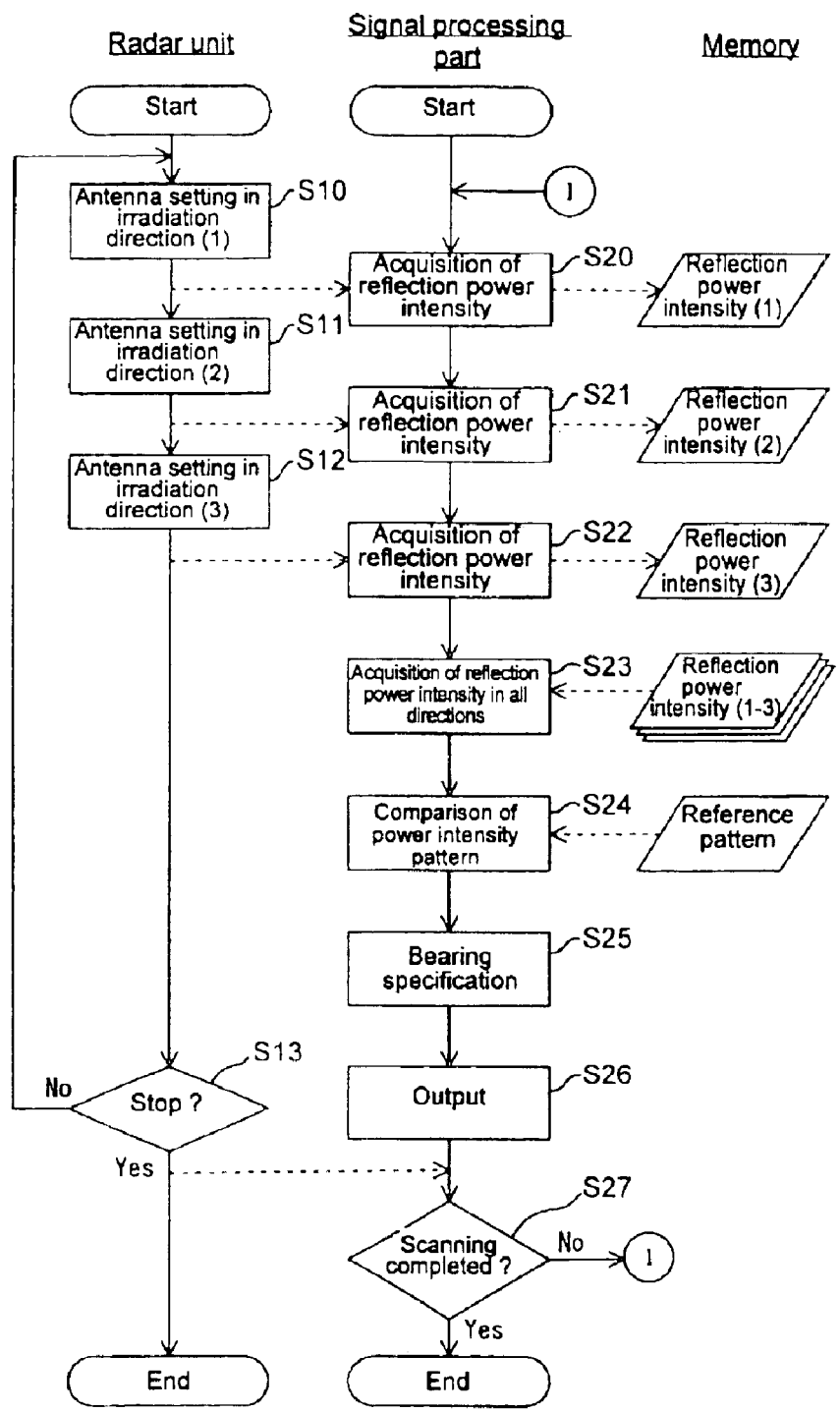
FIG. 4 is a flowchart showing an operational flow of object detection.

The object detecting operation is performed according to a flowchart shown in FIG. 4, in which a flow on the left side designates an antenna scanning operation in the radar unit 2, a flow in the middle designates a signal processing operation in the signal processing part 30, and data on the right side designates information stored in the memory 31. According to this embodiment, the antenna scanning operation is mainly performed and the signal processing operation is performed subordinately in accordance with the scanning operation timing.

When the radar unit 2 starts to operate, the scanning controller 21 sets the directional characteristics of the scanning antenna 20 at the irradiation direction (1) at step S10. The scanning antenna 20 irradiates a beam based on the signal generated by the sensor head 22, and receives the echo from a detection object obtained in the mainlobe or the sidelobe. The sensor head 22 finds reflection power intensity from the received echo and outputs it to the signal processing part 30. At this time, the scanning controller 21 outputs the bearing information to the signal processing part 30.

At step S20, the reflection power intensity and the bearing information referring to the irradiation direction (1) are stored in the memory, 31 by the signal processing part 30.

At step S11, the scanning controller 21 switches the directional characteristics of the scanning antenna 20 to the irradiation direction (2) and the same operations as above are performed to obtain the reflection power intensity and the bearing information referring to the irradiation direction (2). Then, at step S12, the directional characteristics are switched to the irradiation direction (3), the same operations as above are performed to obtain the reflection power intensity and the bearing information referring to the irradiation direction (3).

Thus, when the reflection power intensity information of all irradiation directions (1) to (3) are obtained, the signal processing part 30 reads them from the memory 31 to generate a power intensity pattern at step S23.

At step S24, the reference pattern in each bearing is read from the memory 31 and the power intensity pattern is compared with the reference pattern. At step S25, the signal processing part 30 specifies the bearing of the detection object by selecting the reference pattern which is most similar to the power intensity pattern.

At step S26, the thus obtained information about the detection object is output to the outside as needed. The above operations are repetitively performed until a user issues a stop order at step S13 or S27.

As described above, according to the constitution and method of this embodiment, it is not necessary to remove the sidelobe of the antenna, but the echo obtained from the sidelobe can be-used in specifying the bearing. Thus, the constitutions of the antenna and the signal processing part can be simple and inexpensive, and the object detection can be performed with high reliability and no directional error detection, even using an antenna having inferior performance of sidelobe suppression.

Furthermore, since the bearing is not specified based on an absolute value of the reflection power intensity but specified based on the relative variation pattern, the existence of the detection object and its bearing can be detected with high precision without depending on a size of the object or a distance up to the object.

Still further, according to this embodiment, the bearing resolution can be improved about twice as good without changing a variation amount of the irradiation direction of the mainlobe.

In addition, since the reference pattern for each bearing is previously stored in the memory 31 and the bearing is specified by comparing the power intensity pattern obtained by observation with the reference pattern, the operation can be simply performed at high speed.

The above operational effect is demonstrated by the following working example.

WORKING EXAMPLE (Experiment Summary)

An object detecting operation is performed with two kinds of antennas having different performances for sidelobe suppression. At this time, the object detecting operations are performed by way of the conventional method and by way of the method according to the present invention and they are compared with each other with regard to directional detecting precision and bearing resolution.

Figure 5:
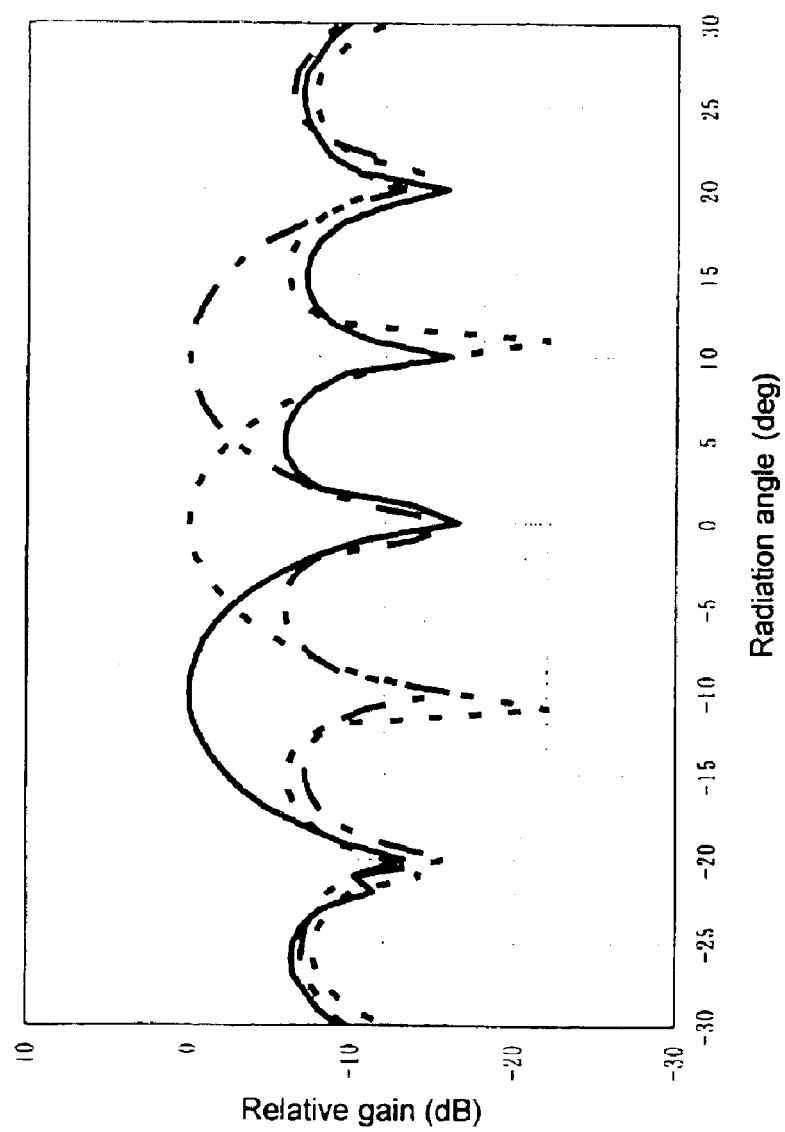
FIG. 5 is a graph of antenna patterns showing directional characteristics of an antenna having a sidelobe suppression ratio of 6 dB.
Figure 6:
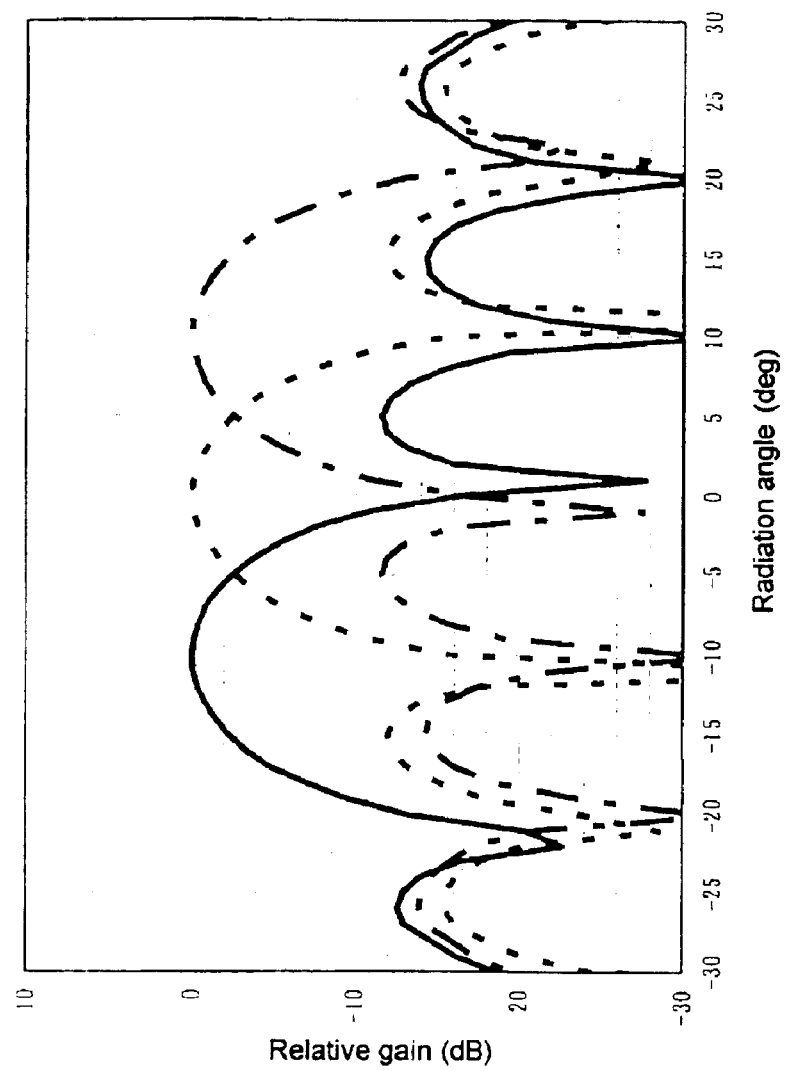
FIG. 6 is a graph of antenna patterns showing directional characteristics of an antenna having a sidelobe suppression ratio of 12 dB.

One antenna has directional characteristics shown in FIG. 5, in which a sidelobe suppression ratio (a level difference between the mainlobe and the sidelobe) is 6 dB, which is inferior. The other antenna has directional characteristics shown in FIG. 6, in which the sidelobe suppression ratio is 12 dB, which is superior.

A target (object to be detected) set in the bearing of 5 degrees on the right was detected by switching the irradiation direction of the mainlobe of each antenna by stages in three directions of 10 degrees on the left, 0 degree on the front and 10 degrees on the right.

As the target, two kinds of targets corresponding to a human body and corresponding to a passenger car were used. A radar cross section (RCS) of the target corresponding to the human body was 0 dBsm and the RCS of the target corresponding to the car was 10 dbsm.

It is assumed that the reflection power intensity of the human target existing in the antenna front direction (direction of 0 degree) is 0 dBm. Since the antenna is the two-way antenna, the power intensity is lowered by −5 dB×2=−10 db in the bearing in which the antenna gain is lowered by −5 dB, so that the detected power intensity is 0 dBm-10 dB=−10 dBm.

Although the reflection power intensity is inversely proportional to the biquadrate of the distance between the antenna and the target, since it is assumed that the power correction has been made previously, it is expected that the same target can be detected by the same reflection power in the detection region.

Figure 7:
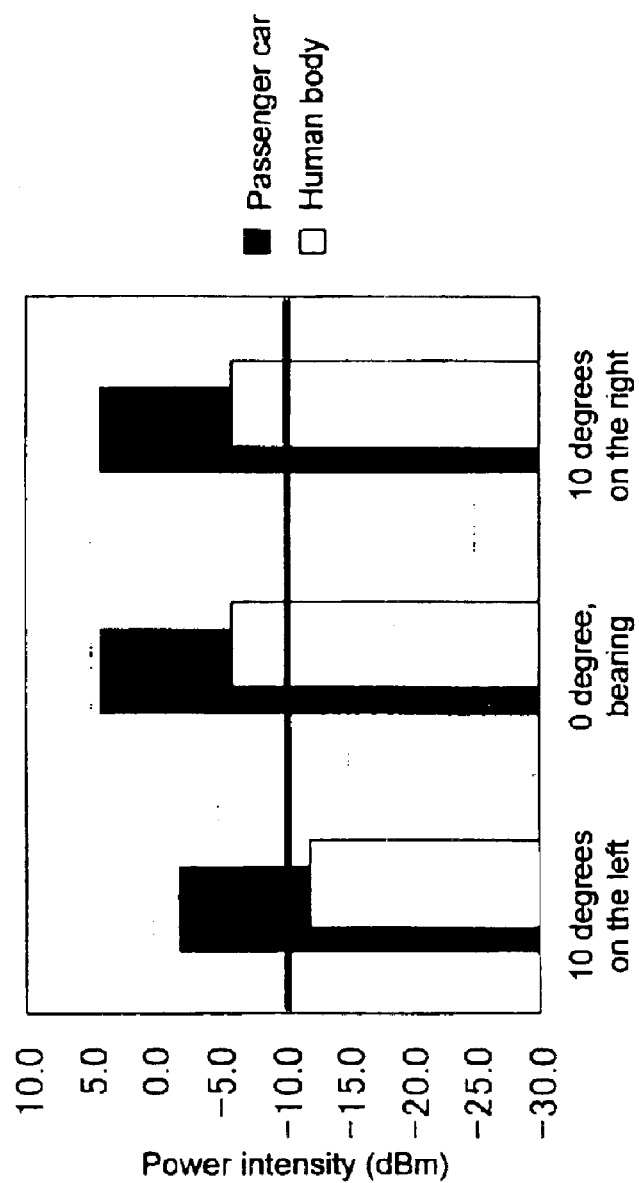
FIG. 7 is a graph showing reflection power intensity in each irradiation direction obtained by the antenna having the sidelobe suppression ratio of 6 dB.
Figure 8:
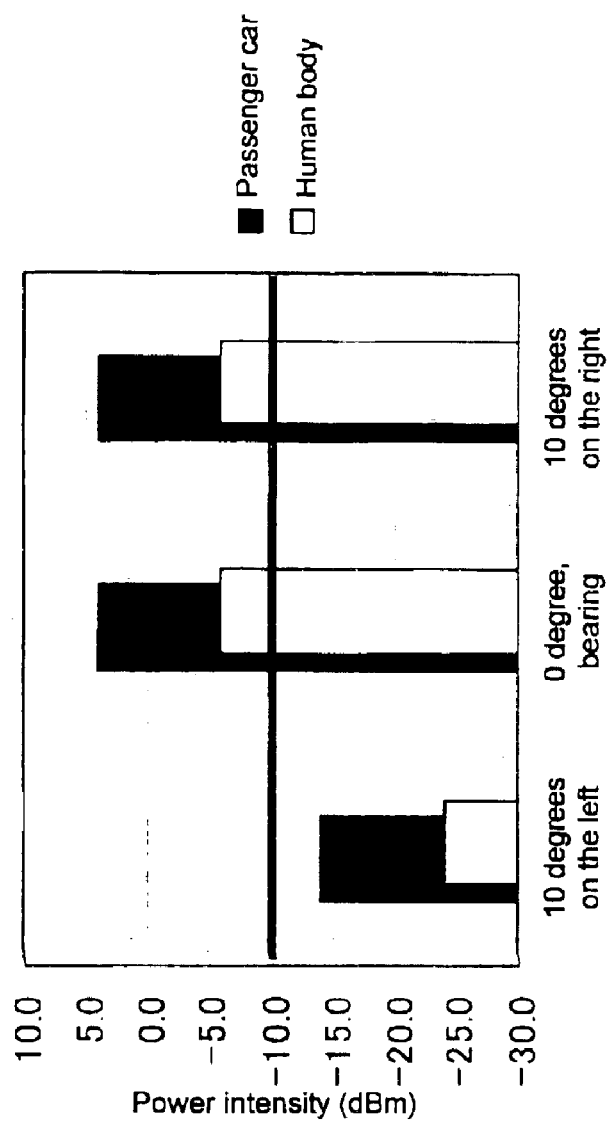
FIG. 8 is a graph showing reflection power intensity in each irradiation direction obtained by the antenna having the sidelobe suppression ratio of 12 dB.

FIG. 7 is a graph showing the reflection power intensity in each irradiation direction, which was obtained by the antenna having the sidelobe suppression ratio of 6 dB. In addition, FIG. 8 is a graph showing the reflection power intensity in each irradiation direction, which was obtained by the antenna having the sidelobe suppression ratio of 12 dB. In FIGS. 7 and 8, a white bar designates the reflection power intensity of the target corresponding to the human body and the black bar designates the reflection power intensity of the target corresponding to the passenger car.

COMPARATIVE EXAMPLE

According to a comparative example to which the prior art was applied, a bearing of a target is specified based on an absolute value of reflection power intensity in a single direction. More specifically, it is determined that the target exists when the reflection power intensity exceeds a predetermine threshold value. In this example, it is assumed that the target corresponding to a human body is detected, and the threshold value was set at −10 dBm, considering antenna gain variation amount 3 dB×2 (for the two-way antenna) in the mainlobe (half-beam angle) and a margin 4 dB.

When the target is the target corresponding to the human body, the reflection power intensity in the direction of 10 degrees on the left is below the threshold value in either antennas having the sidelobe suppression ratios 6 dB or 12 dB. Therefore, it is detected that the target exists in the direction of 10 degrees on the right and 0 degree on the front. Since the target was set in the direction 5 degrees on the right, this can be regarded as a correct detection result.

Meanwhile, in the case of the target corresponding to a passenger car having the large RCS, since the reflection power intensity exceeds the threshold value in all of the directions in the antenna having the sidelobe suppression ratio of 6 dB, it is detected that the target exists in all bearings. In other words, error detection occurs in the direction of 10 degrees on the left. It can been seen from FIG. 8 that this error detection can be avoided when the sidelobe suppression ratio of the antenna is improved to be approximately 12 dB.

Thus, according to the conventional technique, it was necessary to use the antenna having superior performance of sidelobe suppression in order to prevent the directional error detection. In addition, the bearing resolution is determined by the variation amount of the antenna and only the bearing resolution of three bearings per 10 degrees is provided here.

WORKING EXAMPLE

According to a working example to which the present invention was applied, the bearing of a target is specified based on a power intensity pattern.

Figure 9:
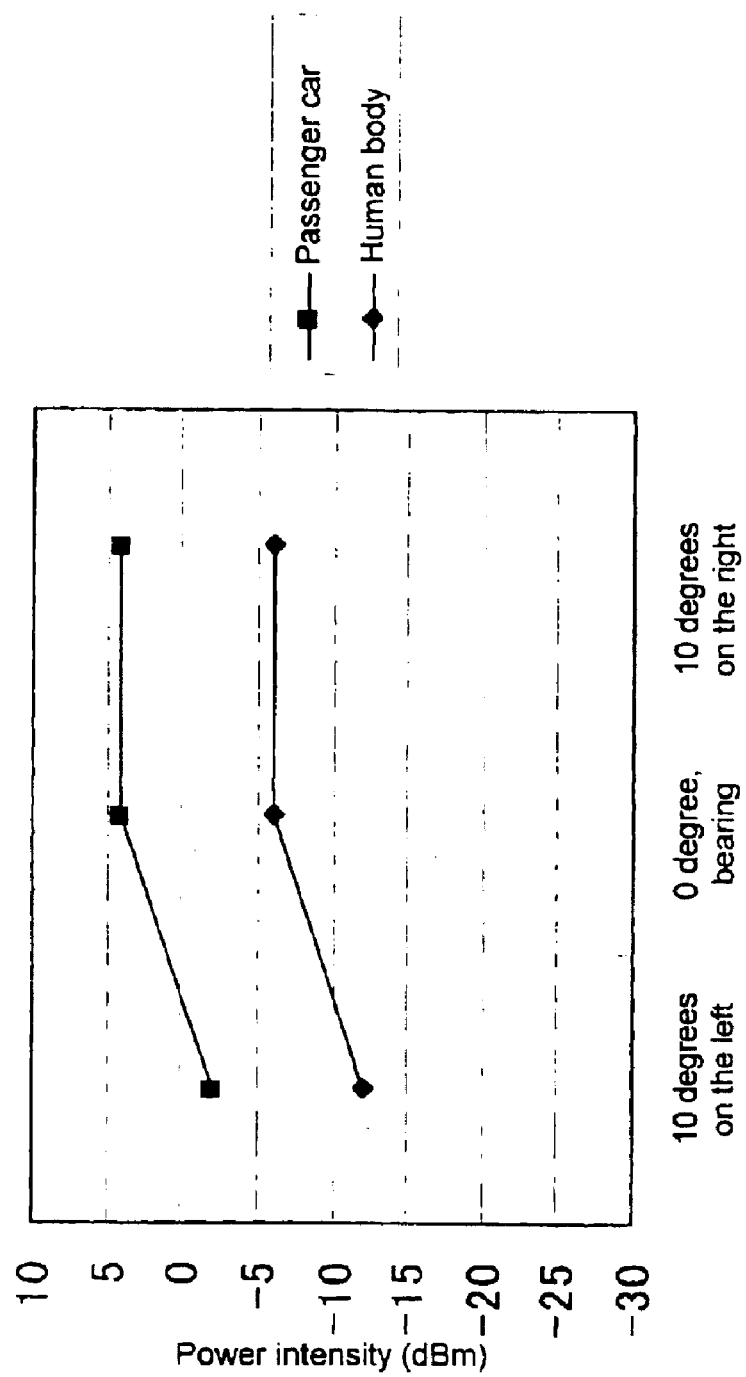
FIG. 9 is a graph showing power intensity patterns obtained from a measured data in FIG. 7.

According to this working example, first, a relative variation of reflection power intensity in each irradiation direction is patterned to generate a power intensity pattern. FIG. 9 is a graph showing the power intensity pattern obtained from the measured data in FIG. 7. A lower line in the graph designates the power intensity pattern of a target corresponding to a human body and an upper line in the graph designates the power intensity pattern of a target corresponding to a car.

Since the power intensity pattern shows the relative variation of the reflection power intensity, it can be seen that the same feature is provided even when the target correspond to the human body or the car regardless of the RCS (size) of the target.

Figure 10:
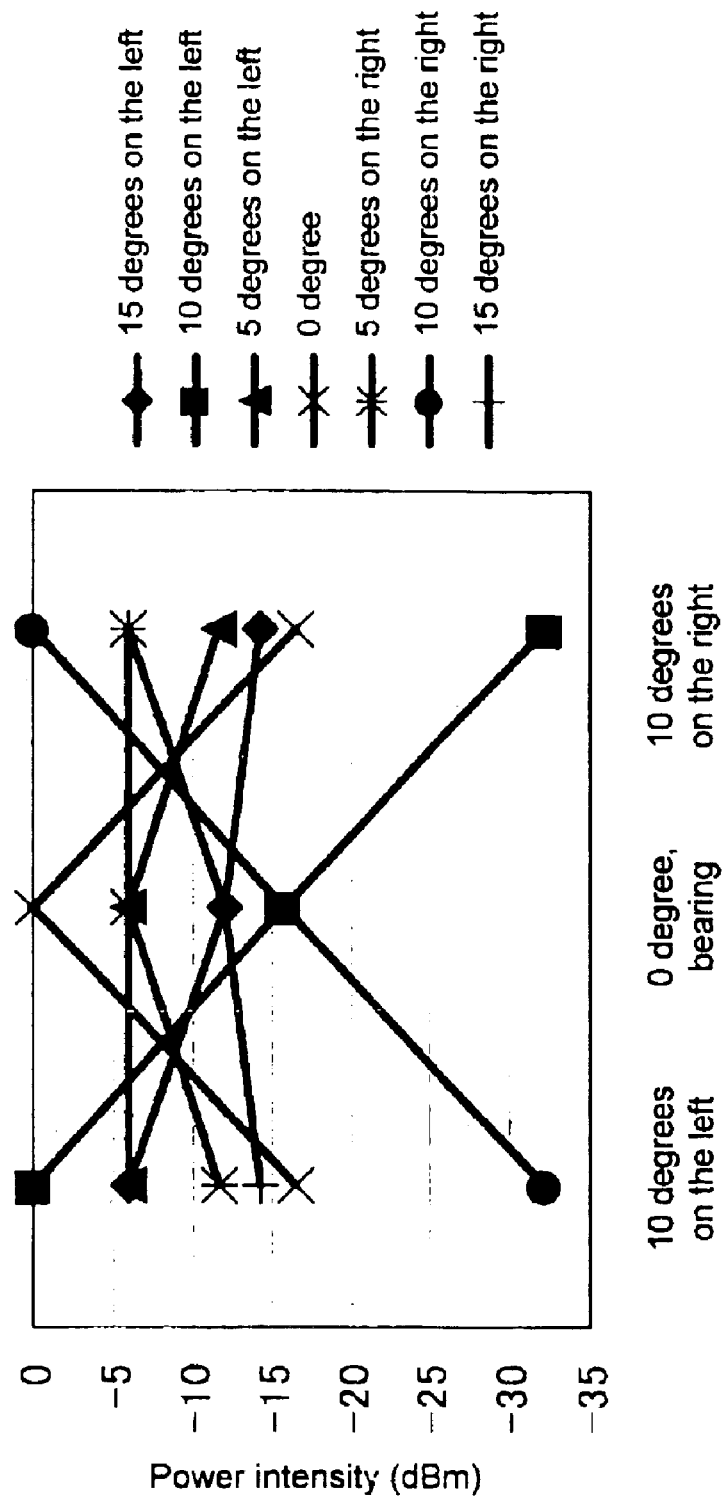
FIG. 10 is a graph showing reference patterns.

FIG. 10 is a graph showing reference patterns previously stored in the memory. There are provided the reference patterns of seven bearings per 5 degrees from the direction of 15 degrees on the left to the direction of 15 degrees on the right. It can seen that the respective reference patterns have clearly distinguished features from each other.

The reference pattern which is most similar to the power intensity pattern is selected by comparing the power intensity pattern (FIG. 9) generated from the measured data with the reference pattern (FIG. 10) with relative values. It is estimated that the bearing according to the selected reference pattern is the bearing in which the target exists.

In this example, since the power intensity patterns in both cases of the target corresponding to the human body and the target corresponding to the passenger car are most similar to the reference pattern of 5 degrees on the right, it is estimated that both of the bearings in which the targets exist are "5 degrees on the right".

Thus, according to this embodiment, the object detection can be performed with high precision regardless of the size of the target.

Furthermore, even when the antenna having inferior performance of the sidelobe suppression is used, directional error detection is not generated.

Still furthermore, the bearing resolution which is almost twice as good as the variation amount (10 degrees) in the irradiation direction of the antenna can be implemented.

As described above, according to the present invention, it is not necessary to remove the sidelobe but the echo obtained from the sidelobe can be used in specifying the bearing. Thus, the constitutions of the antenna and the signal processing part can be simple and inexpensive. In addition, the object detection can be performed without the directional error detection even when the antenna having the inferior performance of the sidelobe suppression is used.

Furthermore, since the bearing is specified based on the pattern of the relative variation of the reflection power intensity, the existence and the bearing of the object can be detected with high precision without depending on the size of the object and distance up to the object.

Still furthermore, since the bearing resolution does not depend on the variation amount of the irradiation direction, the bearing resolution can be easily improved according to the setting of the directional characteristics of the antenna.

What is claimed is:

1. An object detecting method comprising:
    a step of irradiating beams in a plurality of directions by electronically switching an irradiation direction of a mainlobe of a fixed antenna by stages;
    a step of receiving an echo from a detection object obtained in the mainlobe or a sidelobe in each irradiation direction;
    a step of finding reflection power intensity in each irradiation direction from the received echo; and
    a step of specifying a bearing in which the detection object exists based on a pattern of relative variation of the reflection power intensity in each irradiation direction.

2. The object detecting method according to claim 1, comprising a step of finding the reflection power intensity from the received echo without distinguishing between the echo obtained in the mainlobe and the echo obtained in the sidelobe.

3. The object detecting method according to claim 1, comprising a step of setting directional characteristics of the antenna such that an angle between a peak of the mainlobe and a peak of a first sidelobe may become almost double of an angle between the peak of the first sidelobe and a peak of a second sidelobe.

4. The object detecting method according to claim 1, comprising a step of switching the irradiation direction of the mainlobe such that a peak angle of the mainlobe in the next irradiation direction may become an angle of a first null point in the previous irradiation direction.

5. The object detecting method according to claim 1, comprising a step of dividing a detection region into a plurality of bearings, and storing a pattern of relative variation of reflection power in intensity in each irradiation direction when an object exists in the bearing, as a reference pattern in each bearing; and
    specifying a bearing in which a detection object exists by comparing the pattern obtained from the received echo with the reference pattern in each bearing.

6. An object detector comprising:
    an antenna irradiating beams in a plurality of irradiation directions by electronically switching an irradiation direction of a mainlobe of a phased array antenna by stages, and receiving an echo from a detection object obtained in the mainlobe or a sidelobe in each irradiation direction;

means for finding reflection power intensity in each irradiation direction from the received echo; and means for specifying a bearing in which the detection object exists based on a pattern of relative variation of the reflection power intensity in each irradiation direction.

7. The object detector according to claim 6, wherein the reflection power intensity is found from the received echo without distinguishing between the echo obtained from the mainlobe and the echo obtained from the sidelobe.

8. The object detector according to claim 6, wherein directional characteristics of the antenna is set such that an angle between a peak of the mainlobe and a peak of a first sidelobe may become almost double of an angle between the peak of the first sidelobe and a peak of a second sidelobe.

9. The object detector according to claim 6, wherein the irradiation direction of the mainlobe is switched such that a peak angle of the main lobe in the next irradiation direction may become an angle of a first null point in the previous irradiation direction.

10. The object detector according to any one of claims 6, comprising means for dividing a detection region into a plurality of bearings and storing a pattern of relative variation of reflection power intensity in each irradiation direction when the object exists in the bearing, as a reference pattern in each bearing, wherein the bearing in which the detection object exists is specified by comparing the pattern obtained from the received echo with the reference pattern in each bearing.

* * * * *